United States Patent [19]

Hayashi

[11] Patent Number: 5,031,115
[45] Date of Patent: Jul. 9, 1991

[54] PRINTER INTERFACE USING PRINTER RESPONSE TO DETERMINE PRINTER TYPE

[75] Inventor: Yasushi Hayashi, Kawasaki, Japan

[73] Assignee: Kabushiki Kaisha Toshiba, Kawasaki, Japan

[21] Appl. No.: 342,789

[22] Filed: Apr. 25, 1989

[30] Foreign Application Priority Data

Apr. 28, 1988 [JP] Japan ................................ 63-106527

[51] Int. Cl.[5] .......................... G06F 3/00; H04N 1/32
[52] U.S. Cl. .................................. 364/519; 364/900;
364/930; 358/296
[58] Field of Search .............. 364/200, 900, 519, 518;
400/76, 62, 65; 358/296

[56] References Cited

U.S. PATENT DOCUMENTS

| | | | |
|---|---|---|---|
| 4,179,732 | 12/1979 | Khan et al. | 364/200 |
| 4,394,685 | 7/1983 | Yeomans et al. | 358/264 |
| 4,486,828 | 12/1984 | Kitamura et al. | 364/200 |
| 4,589,063 | 5/1986 | Shah et al. | 364/200 |
| 4,661,988 | 4/1987 | Shimizu | 382/65 |
| 4,680,732 | 7/1987 | DiCenzo | 364/900 |
| 4,713,780 | 12/1987 | Schultz et al. | 364/514 |
| 4,760,406 | 1/1988 | Sato et al. | 346/33 R |
| 4,924,320 | 5/1990 | Tanaka et al. | 358/296 |

Primary Examiner—Gary V. Harkcom
Assistant Examiner—Raymond J. Bayerl
Attorney, Agent, or Firm—Finnegan, Henderson, Farabow, Garrett and Dunner

[57] ABSTRACT

A Central Processing Unit (CPU) sends a parity command to each printer in a printing system including a plurality of printers and discriminates status data returned from the printers in response to the parity command to determine which printer is coupled to a printer interface and reads out a system program associated with the printer from a magnetic disk device. The CPU also causes a selector of the printer interface to select a dot clock signal for the printer presently coupled to the printer interface, reads out image data from a memory using this dot clock signal and sends the acquired data to the coupled printer.

2 Claims, 4 Drawing Sheets

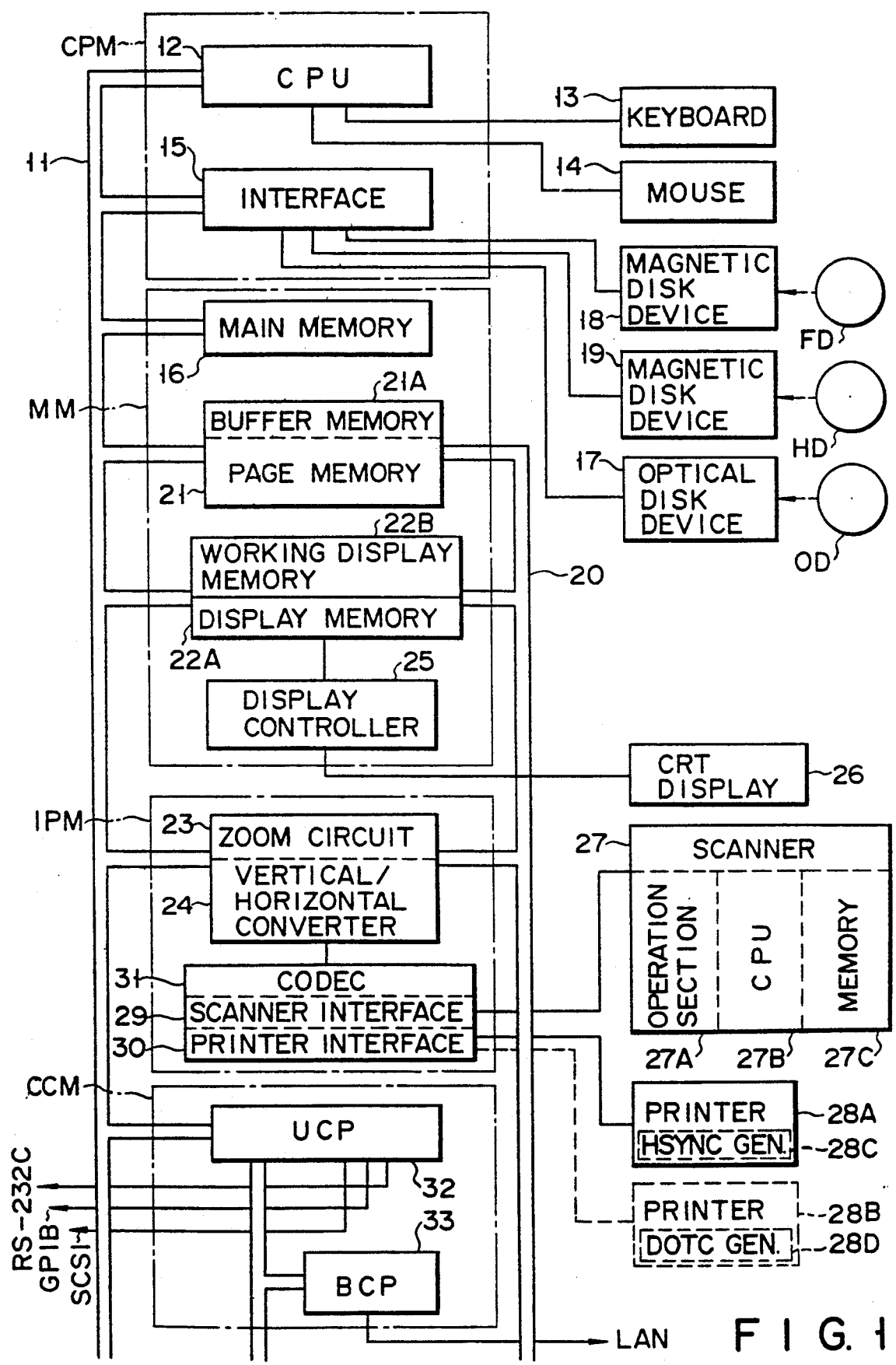
F I G. 1

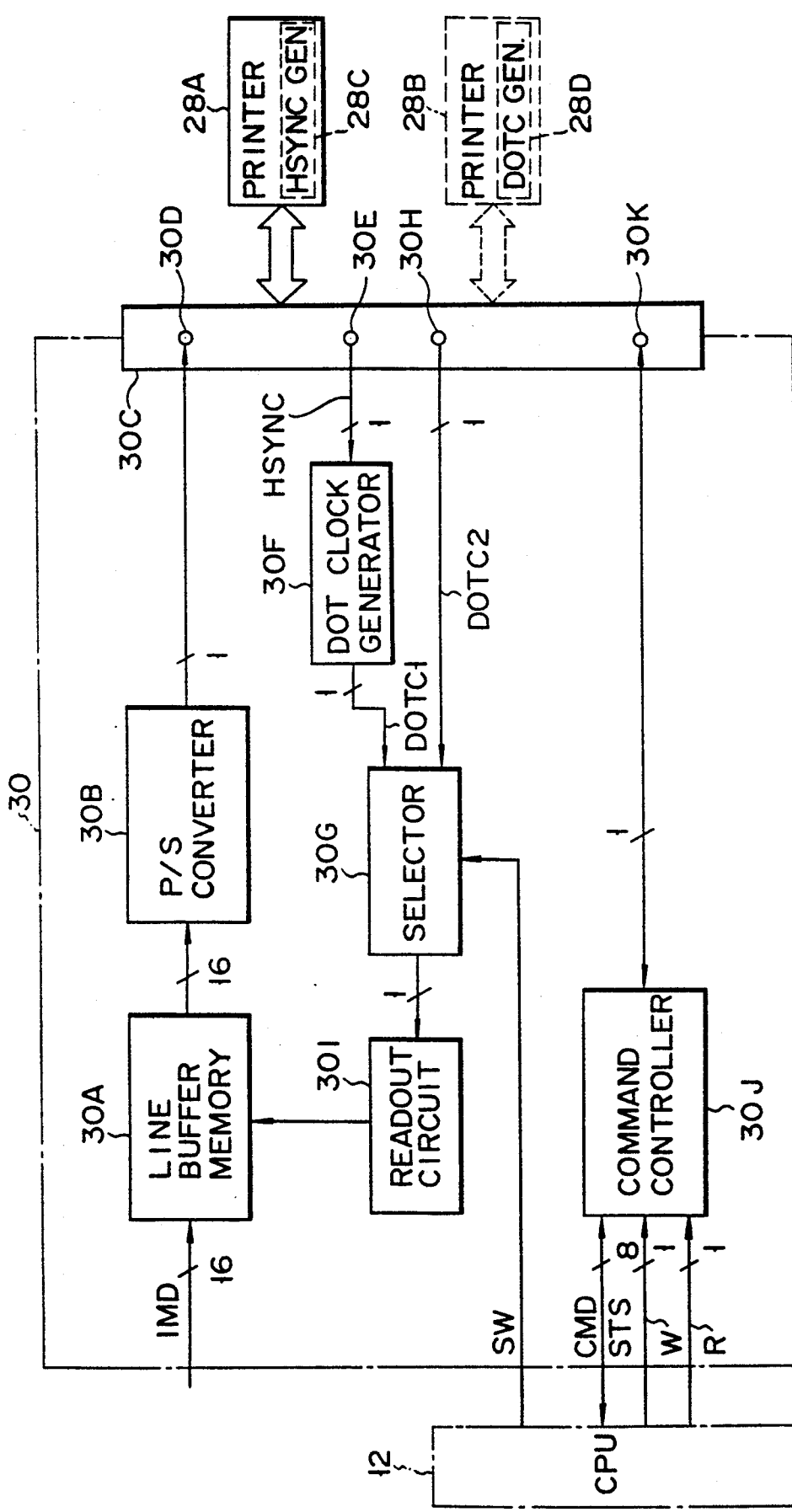
F I G. 2

| | |
|---|---|
| MSB — BIT7 | |
| BIT6 | BITS 1–7: COMMAND SECTION |
| BIT5 | |
| BIT4 | |
| BIT3 | |
| BIT2 | |
| BIT1 | |
| LSB — BIT0 | ODD PARITY BIT |

FIG. 4

| | |
|---|---|
| MSB — BIT7 | 1: IMPROPER OR PARITY COMMAND 0: NORMAL |
| BIT6 | |
| BIT5 | BITS 1–6 ARE ALL "0" IN CASE OF ERROR STATUS |
| BIT4 | |
| BIT3 | |
| BIT2 | |
| BIT1 | |
| LSB — BIT0 | ODD PARITY BIT |

FIG. 6

| | |
|---|---|
| MSB — BIT7 | ODD PARITY BIT |
| BIT6 | |
| BIT5 | |
| BIT4 | BITS 0–6: COMMAND SECTION |
| BIT3 | |
| BIT2 | |
| BIT1 | |
| LSB — BIT0 | |

FIG. 3

| | |
|---|---|
| MSB — BIT7 | ODD PARITY BIT |
| BIT6 | |
| BIT5 | BITS 1–5 ARE UNSETTLED IN CASE OF ERROR STATUS |
| BIT4 | |
| BIT3 | |
| BIT2 | |
| BIT1 | 1: PARITY 0: IMPROPER COMMAND |
| LSB — BIT0 | 1: ERROR, 0: NORMAL |

FIG. 5

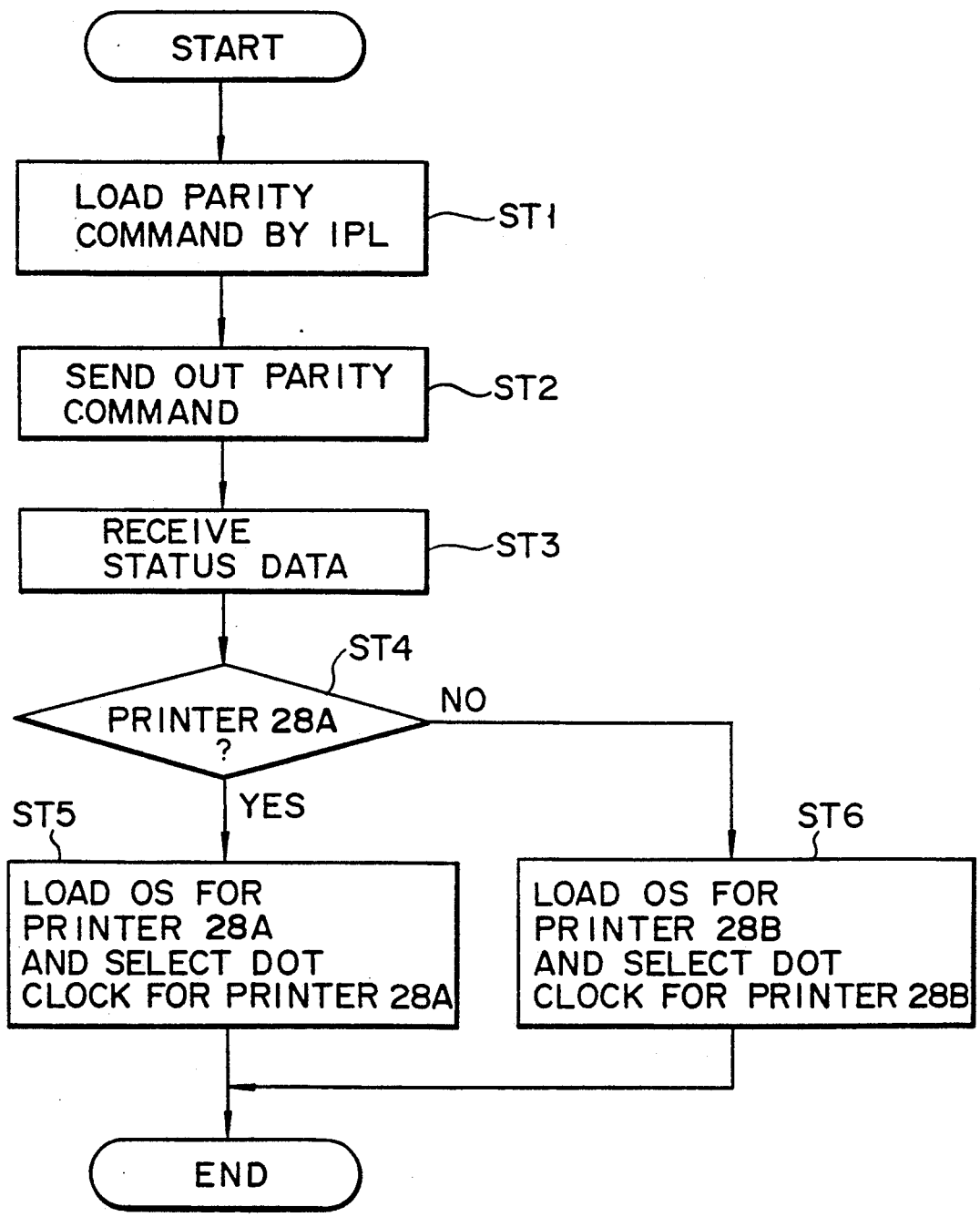
F I G. 7

PRINTER INTERFACE USING PRINTER RESPONSE TO DETERMINE PRINTER TYPE

BACKGROUND OF THE INVENTION

1. Field of the Invention

The present invention relates to a printer interface which permits selective connection of printers of different specifications.

2. Description of the Related Art

An image processing apparatus which can print out image data scanned from an original document or read out from a memory is described in, for example, U.S. Pat. No. 4,661,988. Only one printer is coupled to the apparatus and different printers having different command data and status data cannot be coupled thereto.

There is a growing demand for an image processing apparatus of a type which allows printers having different command data and status data to be coupled thereto. In this case, the image processing apparatus should be provided with interface circuits and operating systems for the individual printers, and the interface circuits and operating systems should be properly and selectively switched in accordance with the types of printers coupled to the apparatus.

However, it is inconvenient and time consuming to manually switch the interface circuits and operating systems from one to another in accordance with the actual printer to be coupled to the image processing apparatus.

SUMMARY OF THE INVENTION

Accordingly, it is an object of this invention to provide an interface apparatus which can automatically and quickly set up a system in accordance with the operating characteristics of a printer to be coupled to an image processing apparatus.

To achieve this and other objects, there is provided an interface apparatus comprising a plurality of printer means for printing image data, and outputting mutually different status data in response to an input operation command; connection means selectively coupled to one of the plurality of printer means; first supply means for supplying print data through the connection means to the one printer means; second supply means for supplying an operation command to the one printer means; and selection means for selecting a timing at which the first supply means supplies the image data in accordance with the status data output from the one printer means.

BRIEF DESCRIPTION OF THE DRAWINGS

FIG. 1 is a diagram illustrating one embodiment of this invention;

FIG. 2 is a diagram illustrating a first section of FIG. 1;

FIGS. 3 and 4 are diagrams for explaining the structure of command data;

FIGS. 5 and 6 are diagrams for explaining the structure of status data; and

FIG. 7 is a flowchart for explaining the operation of the illustrated embodiment of this invention.

DETAILED DESCRIPTION OF THE PREFERRED EMBODIMENT

A preferred embodiment of this invention will now be described referring to the accompanying drawings.

In FIG. 1, a control module CPM and a communication control module CCM are coupled to a system bus 11. A memory module MM and an image processing module IPM are coupled to the system bus 11 and an image bus 20. The control module CPM includes a CPU 12 and an interface 15 both coupled to the system bus 11. The CPU 12 controls the general control of the apparatus and can execute a multitask operation. CPU 12 is coupled to a keyboard 13 for entering various data including command data, and a mouse 14 serving as a pointing device. The mouse 14 moves a cursor on the screen of a CRT display 26 (which will be described below) and has first and second buttons (not shown) for specifying the position of the cursor on the screen.

The interface 15 is coupled to an optical disk device 17 and magnetic disk devices 18 and 19. The optical disk device 17 is loaded with an optical disk OD which stores image data. The magnetic disk device 18 comprises, for example, a floppy disk device and is loaded with a floppy disk FD. The magnetic disk device 19 comprises, for example, a hard disk device, and includes a hard disk HD. These magnetic disk devices 18 and 19 store retrieval data of the optical disk OD, display data (processing data) necessary for data retrieval, etc. The magnetic disk device 19 further stores a printer discrimination program and operating systems associated with a plurality of printers having different operating characteristics.

The memory module MM comprises a main memory 16 coupled to the system bus 11, a page memory 21, a buffer memory 21A, a display memory 22A, a working display memory 22B, and a display controller 25 coupled to the display memory 22A. The memories 21, 21A, 22A and 22B are coupled between the system bus 11 and the image bus 20.

The main memory 16 stores operation programs for CPU 12. The page memory 21 stores data scanned by a scanner 27 (which will be described below) and data enlarged or reduced by a zoom circuit 23. The buffer memory 21A, provided at part of the page memory 21, stores data read out from the optical disk device 17. The display memory 22A and working display memory 22B store display data. The display controller 25 is coupled to the CRT display 26 and displays the data stored in the display memory 22A on the CRT display 26.

The image processing module IPM comprises the zoom circuit 23, a vertical/horizontal converter 24, both coupled to the system bus 11 and image bus 20, a coder/decoder (CODEC) 31 coupled to the converter 24, a scanner interface 29, and a printer interface 30, both coupled to the CODEC 31. The scanner interface 29 is coupled to the scanner (two-dimensional scanner) 27, and the printer interface 30 is adapted to be selectively coupled to a printer 28A or a printer 28B. These printers 28A and 28B provide a hard copy of image data scanned by the scanner 27 or image data read out from the optical disk device 17 and have different operating characteristics including command data, status data and printing speeds, for example. The printer 28A has a horizontal sync signal generator (HSYNC GEN.) 28C for generating horizontal sync signals (HSYNC) synchronous with the printing operation of the printer 28A. Printer 28B has a dot clock signal generator (DOTC GEN.) 28D for generating dot clock signals synchronous with the printing operation of the printer 28B.

The zoom circuit 23 performs an enlarge/reduce process on image data supplied from the page memory 21. The vertical/horizontal converter 24 executes vertical/horizontal conversion of the image data from the page memory 21. The CODEC 31 converts, for example, the image data supplied through the scanner interface 29 from the scanner 27 into a predetermined code, converts a code from the page memory 21 into image data, and sends out the resultant, converted data to the printer 28A or 28B through the printer interface 30.

The scanner 27 scans an original image data bearing medium (for example, a document) with light to provide an electric signal corresponding to the image data of the original document. The scanner 27 is provided with an operation section 27A for setting various parameters, such as the size of an original document to be scanned, the density of the original document and the scanning density, a CPU 27B for controlling the scanner 27 and a memory 27C for storing the various parameters set by the operation section 27A.

The communication control module CCM comprises a UCP (universal communication processor) 32 coupled to the system bus 11, and a BCP (business communication processor) 33 coupled to the UCP 32. The UCP 32 is an interface for devices such as an RS-232C, a GPIB and a SCSI, while the BCP 33 is a LAN (local area network) interface.

FIG. 2 illustrates the printer interface 30, which has a common command protocol and different image protocols for the printers 28A and 28B.

A line buffer memory 30A is supplied with image data IMD read from, for example, the page memory 21, and stores four lines of image data, for example. The line buffer memory 30A is coupled to a parallel/serial (P/S) converter 30B. The parallel/serial converter 30B converts a 16-bit parallel signal from the line buffer memory 30A into a 1-bit serial signal and is coupled to a terminal 30D of a connector 30C.

The connector 30C is supplied at terminal 30E with a horizontal sync signal (HSYNC) from a printer. Terminal 30E is also coupled to a dot clock generator 30F. Dot clock generator 30F generates a first dot clock signal DOTC1 in accordance with the horizontal sync signal (HSYNC) output from printer 28A, which is coupled to connector 30C. The dot clock generator 30F is coupled to selector 30G which is also coupled to a terminal 30H of the connector 30C. Printer 28B is coupled to the connector 30C, and terminal 30H is supplied with a second dot clock signal DOTC2 from the printer 28B.

In accordance with a switch command SW supplied from the CPU 12, the selector 30G selects either the first dot clock signal supplied from the dot clock generator 30F or the second dot clock signal supplied through the terminal 30H.

The selector 30G is coupled to a readout circuit 30I which is coupled to a read signal input terminal of the aforementioned line buffer memory 30A. This readout circuit 30I counts the dot clock signal from the selector 30G 16 times and generates a read signal for the line buffer memory 30A.

A command controller 30J is supplied with command data (CMD), a command write signal W and a status read signal R from the CPU 12 and is coupled to a terminal 30K of the connector 30C. The command controller 30J receives 1-byte command data CMD in synchronism with the command write signal W, sends the data CMD to the printer coupled to the connector 30C and sends status data STS, supplied from this printer in association with the command data CMD, to the CPU 12 in synchronism with the status read signal R.

FIGS. 3 and 4 illustrate the structures of command data used for two different types of printers 28A and 28B adapted to be coupled to the aforementioned printer interface 30, FIG. 3 corresponding to the printer 28A and FIG. 4 to the printer 28B.

FIGS. 5 and 6 illustrate the structures of status data associated with the command data; FIG. 5 corresponding to the printer 28A and FIG. 6 to the printer 28B. Both the command data and status data have a 1-byte structure.

The command data for the printer 28A as shown in FIG. 3 has bit 7 (MSB) serving as an odd parity bit and the remaining seven bits, 0 (LSB) to 6, representing the content of the command data. Table 1 below illustrates different command data for the printer 28A.

TABLE 1

| (MSB) (LSB) | (HEX) |
|---|---|
| 1 0 0 0 0 0 0 0 | 8 0 |
| 0 0 0 0 0 0 0 1 | 0 1 |
| 0 0 0 0 0 0 1 0 | 0 2 |
| 1 0 0 0 0 0 1 1 | 8 3 |
| 0 0 0 0 0 1 0 0 | 0 4 |
| . | . |
| . | . |
| . | . |
| 0 1 1 1 1 1 1 1 | E F |

The command data for the printer 28B as shown in FIG. 4 has the same structure as that shown in FIG. 3 except that bit 0 (LSB) instead of bit 7 serves as the odd parity bit. Table 2 below illustrates different command data for the printer 28B.

TABLE 2

| (MSB) (LSB) | (HEX) |
|---|---|
| 0 0 0 0 0 0 0 1 | 0 1 |
| 0 0 0 0 0 0 1 0 | 0 2 |
| 0 0 0 0 0 1 0 0 | 0 4 |
| 0 0 0 0 0 1 1 1 | 0 7 |
| 0 0 0 0 1 0 0 0 | 0 8 |
| . | . |
| . | . |
| 1 1 1 1 1 1 1 0 | F E |

The status data for the printer 28A as shown in FIG. 5 has bit 7 (MSB) serving as an odd parity bit. Bit 0 (LSB) is "0" in the normal status, and bits 1 to 6 represent the content of the normal status. For an error status, bit 0 becomes "1". Bit 1 is "1" in case of a parity error and is "0" in case of an improper command error. Bits 1 to 5 are unsettled. Table 3 illustrates the contents of an error status in the case a parity error has occurred.

TABLE 3

| (MSB) (LSB) | (HEX) |
|---|---|
| 1 0 0 0 0 0 1 1 | 8 3 |
| 0 0 0 0 0 1 1 1 | 0 7 |
| 1 0 0 0 1 1 1 1 | 8 F |

The status data for the printer 28B as shown in FIG. 6 has bit 0 (LSB) serving as an odd parity bit. Bit 7 (MSB) is "0" in the normal status, and bits 1 to 6 represent the content of the normal status. For an error status, bit 7 becomes "1" and is fixed to "80" in hexadecimal numbers. Table 4 below illustrates the content of an error status in the case a parity error has occurred.

TABLE 4

| (MSB) | (LSB) | (HEX) |
|---|---|---|
| 1 0 0 0 0 0 0 0 | | 8 0 |

Comparing the status of the printer 28A with that of the printer 28B in the case where a parity error has occurred, it should be understood that the bits 0 and 1 are always "1" for the printer 28A whereas they are always "0" for the printer 28B.

According to this embodiment, the type of printer coupled to the printer interface 30 is discriminated using the difference in the status data associated with the command data, and connection of the printer interface circuit is switched to the proper destination printer and operating system in accordance with the discrimination result.

Referring to FIG. 7, the operation of the CPU 12 will be described below.

When power of the apparatus is turned ON, an IPL (initial program loader) stored in the magnetic disk device 19 is loaded in the main memory 16 by a bootstrap (not shown), and a printer discrimination program stored in the magnetic disk device 19 is loaded in the main memory 16 by this IPL (step ST1). Then, the printer discrimination program permits a parity command to be sent through the printer interface 30 to a printer (step ST2). The parity command may be "00" (Hex), "03" (Hex), etc.

Since the command controller 30J in the printer interface 30 has a common protocol for the printers 28A and 28B, it can send the parity command to either printer. The status data sent from the printer in response to the parity command has bits 0 and 1 set to "1" when the printer 28A is presently coupled and set to "80" (Hex) for the printer 28B.

Upon reception of the status data from the printer through the command controller 30J (step ST3), the CPU 12 discriminates, based on the received data, whether the printer 28A or 28B is presently coupled to the image processing apparatus (step ST4). If the printer 28A is coupled, the operating system for the printer 28A is loaded into the main memory 16 from the magnetic disk device 19, and a switch command SW is sent to the selector 30G of the printer interface 30. The selector 30G then selects the first dot clock signal DOTC1 from the dot clock generator 30F (step ST5). If the printer 28B is coupled in step ST4, the operating system for printer 28B is similarly loaded into the main memory from the magnetic disk device 19, and the switch command SW is sent to the selector 30G of the printer interface 30. Selector 30G then selects the second dot clock signal DOTC2 supplied from the printer 28B through the terminal 30H (step ST6).

According to this embodiment, since printers with different specifications have different status bit patterns with respect to a parity command, the type of printer presently coupled to the image processing apparatus is discriminated by checking the status bit pattern returned from the printer in response to the parity command. In accordance with the discrimination result, the operation system for the connected printer is loaded into the main memory 16 from the magnetic disk device 19, and the connection of the printer interface circuit is switched to the proper printer (selecting the proper dot clock signal for the printer). With the above design, system setting can be automatically performed when the apparatus is turned ON, thus making the set-up operation easier and significantly reducing the time required for the system set-up.

Although the above embodiment has been described with reference to two types of printers coupled to the image processing apparatus, more than two types of printers may be coupled to the image processing apparatus.

In addition, although the description of the above embodiment has been given with reference to printer devices, this invention is not limited to this case and can apply to other input/output devices as well.

What is claimed is:

1. An interface apparatus, comprising:
   first and second printer means for printing image data and outputting mutually different status data in response to an input operation command;
   connection means selectively coupled to one of said first and second printer means;
   memory means for storing said image data;
   readout means for reading out said image data stored in said memory means and supplying said image data to said one of said first and second printer means;
   supply means for supplying an operation command to said one of said first and second printer means; and
   selection means for selecting a read timing of said readout means in accordance with said status data output from said one of said first and second printer means in response to said operation command.
   wherein said first printer means includes a first signal generator for generating a horizontal sync signal in synchronization with printing of said image data;
   said second printer means includes a second signal generator for generating a first read signal for reading out said image data in synchronization with printing of said image data; and
   said selection means includes a third signal generator for generating a second read signal in response to said horizontal sync signal from said first printer means, and a selection circuit for selecting said second read signal from said third signal generator when said first printer means is coupled to said connection means and for selecting said first read signal from said second signal generator when said second printer means is coupled to said connection means, in accordance with said status data from said one of said first and second printer means.

2. An interface apparatus, comprising:
   first and second printer means for printing image data and outputting mutually different status data in response to an input operation command;
   connection means selectively coupled to one of said first and second printer means;
   first memory means for storing said image data;
   first readout means for reading out said image data stored in said first memory means and supplying said image data to said one first and second printer means;
   second memory means for storing first control data for controlling an operation of said first printer means and second control data for controlling an operation of said second printer means;
   third memory means for storing one of said first and second control data stored in said second memory means;
   supply means for supplying an operation command to said one of said first and second printer means;

selection means for selecting a read timing of said first readout means in accordance with said status data output from said one of said first and second printer means in response to said operation command; and second readout means for reading out one of said first and second control data stored in said second memory means and for storage said read control data in said third memory means in accordance with said status data, wherein said first printer means includes a first signal generator for generating a horizontal sync signal in synchronization with printing of said image data;

wherein said second printer means includes a second signal generator for generating a first read signal for reading out said image data in synchronization with printing of said image data; and wherein said selection means includes a third signal generator for generating a second read signal in response to said horizontal sync signal from said first printer means, and a selection circuit for selecting said second read signal from said third signal generator when said first printer means is coupled to said connection means and selecting said first read signal from said second signal generator when said second printer means is coupled to said connection means, in accordance with said status data from said one of said first and second printer means.

* * * * *

UNITED STATES PATENT AND TRADEMARK OFFICE
CERTIFICATE OF CORRECTION

PATENT NO. : 5,031,115
DATED : July 09, 1991
INVENTOR(S) : Yasushi Hayashi

It is certified that error appears in the above-identified patent and that said Letters Patent is hereby corrected as shown below:

Claim 1, column 6, line 29, after "command" change "." to --,--.

Signed and Sealed this

Fourth Day of May, 1993

Attest:

MICHAEL K. KIRK

Attesting Officer

Acting Commissioner of Patents and Trademarks